United States Patent [19]

Mix

[11] 4,301,098
[45] Nov. 17, 1981

[54] VAPOR LIQUID CONTACTING

[76] Inventor: Thomas W. Mix, 24 Atwood St., Wellesley, Mass.

[21] Appl. No.: 117,022

[22] Filed: Jan. 30, 1980

[51] Int. Cl.³ .............................................. B01F 3/04
[52] U.S. Cl. ......................... 261/114 R; 55/257 PV; 55/257 PP; 202/158; 202/264; 203/86; 261/114 JP
[58] Field of Search ......... 261/114 JP, 114 R, 114 A, 261/114 TC; 55/257 PP, 257 PV; 202/158, 264, 267 R, 270; 203/20, 86, DIG. 22

[56] References Cited

U.S. PATENT DOCUMENTS

| | | | |
|---|---|---|---|
| 1,748,595 | 2/1930 | Chillas, Jr. et al. | 261/114 R |
| 2,693,949 | 11/1954 | Huggins | 261/114 R |
| 2,737,377 | 3/1956 | Huggins et al. | 261/114 R |
| 2,809,821 | 10/1957 | Constantikes | 261/114 VT |
| 2,832,578 | 4/1958 | Gilmore | 261/114 R |
| 2,884,236 | 4/1959 | Maille | 261/114 JP |
| 3,282,576 | 11/1966 | Bruckert et al. | 261/114 JP |
| 3,467,365 | 9/1969 | Webster | 261/114 JP |
| 3,550,916 | 12/1970 | Hoppe et al. | 261/114 JP |
| 3,573,172 | 3/1971 | Streuber | 261/114 A X |
| 3,647,192 | 3/1972 | De Groot et al. | 261/114 R |
| 3,700,216 | 10/1972 | Uitti et al. | 261/114 R |
| 3,729,179 | 4/1973 | Keller | 261/114 A X |
| 3,784,175 | 1/1974 | Hirao et al. | 261/114 JP X |
| 3,887,665 | 6/1975 | Mix et al. | 261/114 R |
| 4,105,723 | 8/1978 | Mix | 261/114 R X |
| 4,184,857 | 1/1980 | Iijima et al. | 261/114 JP X |
| 4,207,276 | 6/1980 | Ronkainen et al. | 261/114 A |

FOREIGN PATENT DOCUMENTS

| | | | |
|---|---|---|---|
| 45-6751 | 7/1970 | Japan | 55/257 PP |
| 1460709 | 1/1977 | United Kingdom . | |
| 546356 | 3/1977 | U.S.S.R. | 261/114 JP |

OTHER PUBLICATIONS

Sherwood, T. K. and Pigford, R. L., *Absorption and Extraction*, 2nd Ed., McGraw-Hill, New York, 1952, pp. 236-240.
Wallis, G. B.; *One-Dimensional Two-Phase Flow*, McGraw-Hill, New York, 1969, pp. 336-339.
Hoppe et al., (B) "Experience with Indus. Application of Perform-Kontakt Trays", *Chemische Technik* (1971).
Winter et al., Froth Initiators Can Improve Tray Performance", *CEP*, Sep. 1976, pp. 50-53.
Raskop, F., "Perform-Kontakt Plates", *The Chemical Engineer*, Nov. 1974, pp. 709-712.

*Primary Examiner*—Richard L. Chiesa

[57] ABSTRACT

A vapor liquid contacting apparatus having improved column throughput and mass transfer efficiency featuring, in one aspect, an overlay for dissipating vapor hole momentum and reducing vertical oscillations in the liquid vapor dispersion on the tray, and, in another aspect, an improved inlet weir.

31 Claims, 7 Drawing Figures

VAPOR LIQUID CONTACTING

BACKGROUND OF THE INVENTION

This invention relates to vapor-liquid contacting in apparatus of the cross-flow type, e.g. in a fractional distillation column.

In such systems, mass transfer is accomplished by liquid flow across horizontal orificed trays through which vapor is forced. Column throughput and efficient mass transfer are limited by a number of factors including priming, entrainment of the liquid droplets in the vapor flow, downcomer flooding, hydraulic gradient, weeping, transition to spray regime operation, non-plug flow of liquid across the trays, and liquid back-mixing.

Webster, U.S. Pat. No. 3,467,365, shows a layer of expanded metal attached to a sieve tray to give gas entering the vapor/liquid dispersion a component of velocity in the direction of the liquid flow path.

Mix and Erickson, U.S. Pat. No. 3,887,665, shows layers of wire mesh in contact with the tray which serve to limit the oscillations in the vapor/liquid dispersion at the tray surface. A similar function is performed by vertical sheets above the tray in Mix ('665) and Mix, U.S. Pat. No. 4,105,723.

In both aforementioned Mix patents, zigzag woven wire mesh is placed above the vapor/liquid dispersion to recover entrained liquid droplets. In Mix ('732), this zigzag deentrainment mesh is placed on top of an expanded metal support.

Bruckert and Wang, U.S. Pat. No. 3,282,576, shows an inlet weir having a perforated and inwardly and downwardly sloping surface to initiate froth formation in the entering liquid.

Uitti and Carson, U.S. Pat. No. 3,700,216 shows an inwardly and upwardly sloping inlet weir, forming the top of a vertical vapor inlet slot positioned above the tray, to initiate froth formation in the entering liquid.

SUMMARY OF THE INVENTION

In one aspect, the invention features, in general, a plurality of surfaces, positioned above an orificed tray of a vapor liquid contacting apparatus to contact vapor predominantly flowing along a first axis, and liquid flowing along a second axis transverse to the first axis, the surfaces are spaced along and oriented obliquely to the first axis, and spaced along the second axis in a staggered relationship to the first axis; the surfaces have a hydraulic mean diameter greater than one-half the diameter of the tray orifices, and the projection of the surfaces on the tray has no open areas whose greatest dimension is more than three times the hydraulic mean diameter, so that the surfaces deflect vapor and thereby dissipate vapor hole momentum, and reduce vertical oscillations in the vapor-liquid dispersion on the tray.

In preferred embodiments, the surfaces are provided by a plurality of layers of unflattened expanded metal parallel to the tray and to the second axis, and perpendicular to the first axis; various layers are oriented to deflect vapor in respective directions having primary components normal to the second axis, in the positive direction of the second axis, and in the negative direction of the second axis; a first group of layers closest to the tray are closely spaced, being no more than one layer thickness from adjacent layers, and the bottom layer of the group is no further above the tray than the diameter of the tray orifices; additional layers are spaced above the first group, each of which is spaced apart from other layers, and the highest of which is no further from the tray than ½ the distance to the next higher stage.

In another aspect, the invention features, generally, an improved inlet weir with a liquid inlet providing momentum to the liquid in the direction of the liquid flow path, and a vapor inlet including means for mixing gas with the liquid, and giving the vapor a predominant flow component in the direction of the inlet liquid momentum.

In preferred embodiments, the inlet weir has a first surface that is joined at one end to the tray and extends upwardly from the tray and inwardly toward the liquid outlet to end at a juncture with a second surface that extends downwardly toward the outlet and the tray, and ends over an orificed portion of the tray, so as to define a vapor inlet between the surfaces and the tray; a vapor inlet slot is formed between the second surface and a third surface joined to the tray and positioned parallel to and below the second surface; the inlet weir extends at least as high as the downcomer apron; and a deflection plate joined to either the second or third surface is parallel to the tray and positioned between, above, or below layers of expanded metal.

In yet another embodiment, the invention features, in general, a method for retrofitting a vapor liquid-contacting apparatus by increasing the height of the outlet weir and providing means disposed above the tray to limit the increase in froth height to less than that increase which would otherwise accompany the increase in height of the outlet weir. In preferred embodiments, the outlet weir is at least 4 inches high; and the froth height limiting means is a plurality of layers of expanded metal.

DESCRIPTION OF THE PREFERRED EMBODIMENTS

We turn now to a description of the preferred embodiments of the invention after briefly describing the drawings.

DRAWINGS

STRUCTURE

Figure 1:
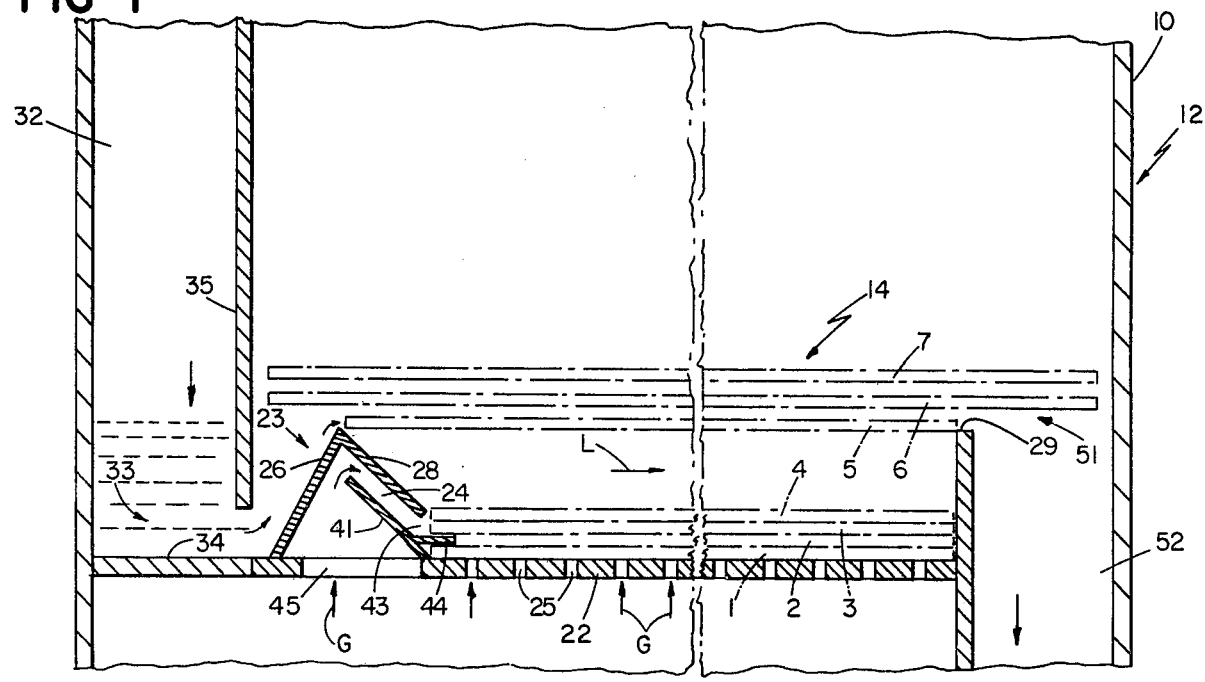
FIG. 1 is a vertical sectional view, broken away, of a contacting-separating device showing one complete stage.

Referring to the drawings, cylindrical housing 10 of liquid-vapor contacting and separating column 12 has a central vapor inlet below its bottom stage. A series of contact stages is vertically arranged inside housing 10. Considering an intermediate stage shown as typical, a plate 22 extends across housing 10. The downcomer 32 with apron 35 carries liquid from the tray above into seal pan 33 with base 34. Inlet weir 23 communicates between pan 33 and the active section of plate 22.

The active section of plate 22 between inlet weir 23 and outlet weir 29 is perforated with holes 25, ½ inch in diameter on 1½ inch triangular centers. The area of the holes thus amounts to 10% of the total area of the active section of the plate, but in low pressure drop applications that area can be higher, e.g., between 15 and 40 percent.

Figure 4:
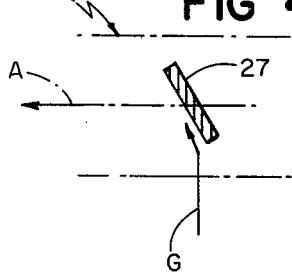
FIGS. 4 and 5 show diagramatically the contact between vertical vapor flow and the expanded metal layers.
Figure 5:
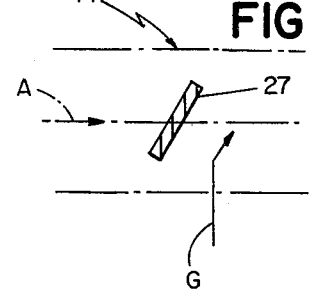

Seven layers 14 (numbered 1-7 sequentially from bottom to top in the Figs.) of expanded metal (of which selected surfaces 27 are shown in FIGS. 4 and 5) are positioned above the active portion of plate 22. The expanded metal has parallelogram shaped openings (short diagonal between ½ and ¾ inch) and is made from stainless steel sheet stock of between 12 and 18 gauge (e.g., Exmet SS (304) 56½). Vapor rising through the plate strikes surfaces 27 obliquely, imparting a net deflection in the direction of the short axis A of the parallelogram opening, as depicted in FIGS. 4.

Figure 3:
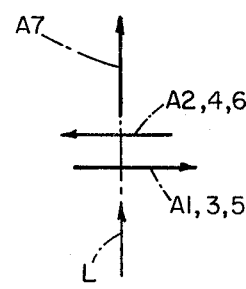
FIG. 3 shows diagramatically the orientation of the expanded metal layers.

The bottom four layers (1-4) form a matrix no more than the diameter of the tray holes above, and preferably in contact with, the upper surface of the active section of the plate. As depicted in FIG. 3, layers 1 and 3 are oriented with axis A normal to the predominant direction L of liquid flow, deflecting the vapor flow to the right in that figure. Layers 2 and 4 are oriented 180° to layers 1 and 3, deflecting vapor to the left in the figure. The layers are closely spaced, each layer being no further than one layer thickness from, and preferably in contact with, adjacent layers.

Layers 5, 6, and 7 are spaced apart, parallel to, and spaced above layers 1-4. Layer 5 is oriented in the same direction as layers 1 and 3, and layer 6 is oriented in the same direction as layers 2 and 4; layer 7 is oriented to deflect vapor in the direction L of liquid flow across the tray (FIG. 3). Layer 5 is spaced above the tray to be located at the top of outlet weir 29; layers 6 and 7 are spaced above layer 5 to create a gap between each of the three layers of between 0.2 and 5 times the height of the outlet weir (e.g., 1.5 inches). The highest layer is spaced above the tray to be less than ½ the distance to the tray of the next highest stage. Layers 6 and 7 extend into the area 51 above downcomer 52.

Inlet weir 23 has surface 26 which meets base 34 at an obtuse angle on the inlet side and is joined to downwardly and inwardly sloping surface 28 which ends above the tray. Surface 41 is parallel to and below surface 28, joining the tray at an acute angle on the inlet side. Inlet 42 formed between surfaces 41 and 28 communicates with the vapor space 45 beneath the tray through slot 24 between surfaces 28 and 41. Deflector 44 joins surface 41 parallel to plate 22 and is positioned between the tray and the uppermost expanded metal layer adjacent the tray.

Figure 6:
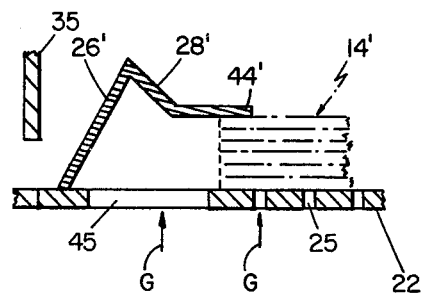
FIGS. 6 and 7 show alternate embodiments of the inlet weir.
Figure 2:
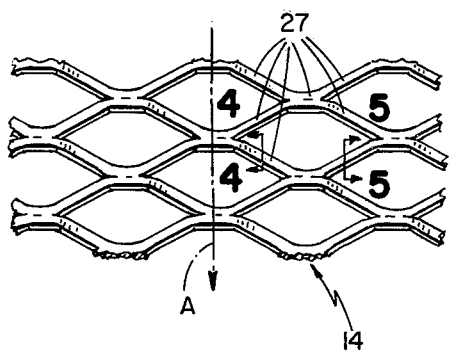
FIG. 2 is a plan view of an expanded metal layer.

Alternatively, the inlet weir can be constructed, as in FIG. 6, without surface 41 and with deflector plate 44' attached to surface 28'. Deflector plate 44' can be over some or all of layers 14'. That embodiment shows six layers in contact with each other.

Figure 7:
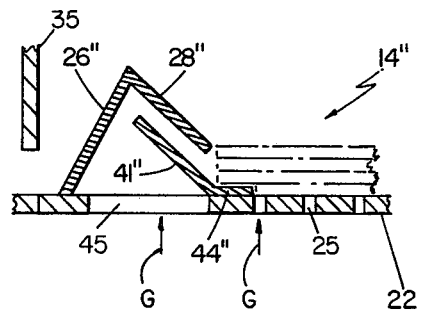

FIG. 7 depicts yet another alternate embodiment in which deflector plate 44" is attached to surface 41" and is in contact with the tray.

Outlet weir 29 extends at least four and typically six inches or more above tray 22. Existing apparatus can be retrofitted by increasing the outlet weir height and adding the expanded metal overlay to limit the froth height increase to less than would otherwise accompany the increased weir height.

OPERATION

The downcomer 32 from the tray above carries liquid from the tray above into seal pan 33 with base 34. The liquid flows under downcomer apron 35 onto the active portion of tray 22 between the base of the inlet downcomer apron 33 and vertical outlet weir 29. Vapor is forced through holes 25 into contact with the liquid. In traversing the holes, the vapor acquires additional momentum (called vapor hole momentum) due to the restricted area of the hole passage. As the vapor obliquely contacts angled surfaces 27 of the expanded metal which are wetted with liquid, the additional momentum is transferred to the liquid and in turn dissipated in drag on the expanded metal surfaces. These deflections of the vapor by the wetted angled surfaces therefore dissipate the hole momentum and generate more efficient mass transfer than would occur if the hole momentum were dissipated in other ways—e.g., in jetting and spray formation, which would lead to vertical oscillation of the gas-liquid dispersion and earlier onset of droplet entrainment and priming, and generate high froth heights and low froth densities. The projection of the surfaces on the tray has no open areas whose greatest dimension is more than three times the hydraulic mean diameter.

In the vicinity of the plate there is in general an upward flow of vapor and liquid in the region over the plate holes, and a return of liquid to the plate in the region between the holes. The return liquid flow is driven by gravity and surface tension forces. The resistance to liquid return flow is a function of the Fanning friction factor which is in turn a function of the Reynolds number. The Reynolds number is proportional to the hydraulic mean diameter of the channels in the plate overlay. Sherwood and Pigford in the second edition of their book *Absorption and Extraction*, on page 239, present the following equation for calculating the hydraulic diameter:

$$D_e/4 = \epsilon/a_v$$

wherein
$\epsilon$ = fraction of voids in the overlay
$a_v$ = surface area per unit volume of the overlay, and
$D_e$ = hydraulic mean diameter.

The larger the hydraulic mean diameter, the larger will be the Reynolds number and the lower will be the Fanning friction factor. For ½ inch number 18 expanded metal, the surface area per unit volume of staggered layers in close contact can be calculated to be 56.5 $ft^2/ft^3$, while the void fraction is 0.866. The mean hydraulic diameter for this overlay is therefore about 0.061 ft.

The large hydraulic diameter of the expanded metal overlay contributes to the efficiency of the gas-liquid contacting. The low resistance to liquid return flow generated by the passages in the metal increases liquid in the region directly over the plate holes to ensure efficient contacting in this critical region of high vapor velocities where a significant fraction of the mass transfer is likely to occur.

An additional advantage of the expanded metal overlay is the possibility with the expanded metal of increasing the fluid mixing normal to the direction of flow across the tray so as to approach more closely plug flow and the full plate to point effect on plate efficiency. This can be achieved with the expanded metal overlay by orienting the layers so as to have the vapor deflected normal to the direction of liquid flow across the tray.

A spaced pair of deflecting layers, oriented so as to deflect vapor normal to the liquid flow path, will result in little or no net deflection of the flow if the deflections of the two layers are opposite to each other, but will result in increased liquid mixing normal to the liquid flow path. The scale of mixing generated normal to the liquid flow between spaced layers will increase with spacing between them, while the mixing along the liquid flow path axis will be relatively unaffected. Thus the stagnant flow regions which are apt to result from chordal flows can be made to mix with the regions of active flow resulting in a much closer approach to plug flow and increased plate efficiency due to the cross-flow effect. If the space between layers is too large, the flow deflection can interfere with the uniformity of contacting by generating a region relatively free of liquid at one side wall and a region with excess liquid at the opposite side wall.

Since the orientation of the deflecting layers can be varied locally, it is also possible to direct the flow of liquid across the tray, so that it is made to diverge as the flow path diverges, without flow separation and without the formation of these stagnant regions. The ability of the overlays to direct the gas-liquid flow thus makes possible the obtaining of a close approximation to plug flow and zero hydraulic gradient without the lowering in liquid residence time and decrease in mass transfer.

The slugs which transport vapor through the froth, in the froth regime, generate troughs and crests in a wave-like action at the froth surface as they erupt through the froth and disengage. Only minimal mass transfer occurs between vapor and liquid in this disengagement region. This region can represent a substantial fraction (equaling 50 percent or greater) of the froth height. Spaced horizontal layers of deflecting surfaces located in this region can damp these wave oscillations, and increase the height of froth over which vapor liquid mass transfer occurs, by increasing the height above the tray of the troughs. At the same time, by reducing the surface oscillations, these spaced layers also reduce liquid back mixing, and hence eddy diffusivity, and thereby increase realizable plate-to-point efficiency gain. Thus, the individual horizontal layers of expanded metal spaced vertically above the plate further restrict oscillations in the froth, and increase the density of the upper regions of the froth to improve the gas-liquid contacting in these regions. The layers further increase throughput by reducing entrainment, by increasing the velocity at which priming will be produced, and by increasing the density of the froth entering the outlet downcomer and thereby increasing the density of the downcomer fluid.

The spaced individual layers are of small enough hydraulic diameter to damp the wave oscillations effectively, but are sufficiently open not to flood—i.e., interfere with the return drainage to the tray of liquid that has passed up through the layer. To avoid flooding, the hydraulic mean diameter should be such as to make $j_g^*$ less than $C^2$ according to the following equations (compare equations 11.84–11.87 of Wallace, *One-Dimensional, Two-Phase Flow*, McGraw-Hill (1969)).

$$j_g^* < C^2$$

where $$j_g^* = j_g \rho_g^{\frac{1}{2}}[gD(\rho_f - \rho_g)]^{-\frac{1}{2}}$$

and where
 $j_g$ is the superficial gas velocity
 D is the hydraulic mean diameter
 g is the gravitational acceleration
 $\rho_f$ is the liquid density
 $\rho_g$ is the gas density
and
 C is a constant between 0.7 and 1.0.

The overlays are sufficiently open (i.e., of large enough hydraulic diameter), and flow through them is sufficiently active throughout, to resist deposition and fouling.

The design of the inlet weir 24 further improves mass transfer and permits operation without weeping at lower vapor velocities, and with trays having higher free areas, by promoting froth formation in the entering liquid. Incoming liquid flows under downcomer apron 35, over inlet weir surface 26, down inlet surface 28 and onto horizontal deflection surface 44. The liquid thus enters as a thin stream with velocity and momentum in the direction of liquid flow across the tray. The vapor from the chamber below the tray enters through slot 25 with a predominant velocity and momentum in the direction of liquid flow. This inlet vapor momentum is partially transferred to the liquid, accelerating and thinning it and preventing the development of a high head of unaerated liquid in this region. The vapor enters under the liquid and flows concurrent with it, promoting froth formation, and ensuring reasonable contact time and hence efficient mass transfer despite the thin liquid layers in this region.

Because the expanded metal overlays dissipate hole momentum efficiently without jetting and spray formation, they make feasible operation at lower rates of liquid flow without blowing (i.e., vapor flow through the plate sweeping liquid off the tray) and without excessive entrainment.

OTHER EMBODIMENTS

Other embodiments are within the following claims. For example, variations in the number and orientation of the layers of metal can be arranged to affect the liquid flow in different ways. Other trays can be used, for example with valve or bubble cap gas openings, or 40 percent free area trays having ⅛ inch diameter holes on 3/16 inch triangular centers. Other thickness sheets of expanded metal can be used. The bottom layer of metal can be suspended above the tray.

The invention is applicable to high-pressure systems as well as for low-pressure systems. It is also applicable over wide ranges of liquid rates. For low pressure-drop applications, such as vacuum fractionations, the combination of the expanded metal overlays and the inlet weir/froth-initiator make possible stable operation with high free area trays as to reduce pressure drop across the tray.

The improved inlet weir can be used with or without the expanded metal layers, and with or without the baffles described in my U.S. Pat. No. 4,105,723, which is hereby incorporated by reference. Retrofitting can be accomplished by using those baffles to limit the froth height increase accompanying increased outlet weir height.

The invention is of course generally applicable to types of vapor-liquid contacting other than the fractionated distillation disclosed above, such as acid gas removal and particulate scrubbing, and the like.

I claim:

1. In vapor-liquid contact apparatus of the cross-flow type having a column housing and at least one contact stage in said housing, said apparatus including liquid and vapor inlets to said stage, a liquid outlet from said stage, and an orificed tray mounted in said housing at said stage, means at said outlet defining a liquid retention zone on said tray, the predominant flow of vapor being along a first axis, the predominant flow of liquid through said zone being along a second axis transverse to said first axis, that improvement comprising a porous matrix in said zone having a plurality of surfaces positioned above said tray to contact said liquid and said gas flowing through said zone, said surfaces being spaced along and oriented obliquely to said first axis, and arranged in layers spaced along said second axis, said surfaces in successive layers being staggered relative to said first axis, said surfaces having a hydraulic mean diameter greater than one-half the diameter of said tray orifices, the projection of said surfaces on said tray having no open areas whose greatest dimension is more than three times the hydraulic mean diameter of the surfaces so that said surfaces deflect vapor and thereby dissipate vapor hole momentum and reduce vertical oscillations in the vapor-liquid dispersion on the tray.

2. The improvement of claim 1 wherein said first axis is perpendicular to said tray and to said second axis.

3. The improvement of claim 1 or 2 wherein said layers are parallel to said tray.

4. The improvement of claim 3 wherein said surfaces of a first layer deflect vapor in a first direction having a primary component normal to said first axis and to said second axis.

5. The improvement of claim 4 wherein said surfaces of a second layer deflect vapor in a second direction generally opposite to said first direction.

6. The improvement of claim 3 wherein said surfaces of at least one of said layers deflect said vapor in a direction having a primary component along said second axis.

7. The improvement of claim 3 wherein said surfaces of at least one of said layers deflect said vapor in a direction having a primary component opposite to the direction of liquid flow along said second axis.

8. The improvement of claim 3 wherein said apparatus includes a plurality of spaced apart vapor-liquid contacting stages, between 1 and 6 of said layers closest to said tray are closely spaced being no more than one layer thickness from adjacent layers, the lowest layer being no further above said tray than the diameter of said orifices in said tray, and the highest layer being no further from said tray than ½ the distance to the next higher stage.

9. The improvement of claim 8 wherein at least one layer is spaced above said closely spaced layers.

10. The improvement of claim 9 wherein said liquid outlet comprises an outlet weir, said layers above said closely spaced layers being spaced apart a distance of between 0.2 and 5 times the height of said outlet weir.

11. The improvement of claim 8 or 9 wherein the surfaces of the layer spaced furthest from said tray deflect the vapor in a direction having a primary component in the direction of liquid flow along said second axis.

12. The improvement of claim 3 wherein said apparatus includes a plurality of spaced apart liquid-vapor contacting stages, the highest of said layers being no further than ½ the distance to the next higher stage.

13. The improvement of claim 12 wherein a downcomer carries liquid away from said stage, at least one of said layers extending over the area above said downcomer.

14. The improvement of claim 3 wherein said layers comprise unflattened expanded metal.

15. The improvement of claim 14 wherein said expanded metal is between 12 and 18 gauge.

16. The improvement of claim 1 wherein the free area of said tray is between 6 and 40 percent of the free area of the active section of said tray.

17. The improvement of claim 1 wherein said liquid outlet comprises an outlet weir extending at least 4 inches above said tray.

18. In vapor-liquid contacting apparatus of the cross-flow type having a column housing and at least one contact stage in said housing, said apparatus including liquid and vapor inlets to said stage, and a liquid outlet from said stage, and an orificed tray mounted in said housing at said stage between said inlets, an improved inlet weir comprising a liquid inlet providing momentum to said liquid in the direction of the liquid flow path, a vapor inlet including means for mixing gas with said liquid, and giving said gas a predominant flow component in the direction of said liquid flow path, and a deflection plate above and parallel to said tray and beneath the liquid after passage through its said inlet, so that the surface of said plate facing away from said tray deflects said liquid in a direction along said tray, said vapor inlet means including an imperforate barrier sloping from above said tray downwardly toward said outlet, the upper surface of said barrier communicating with said liquid inlet to carry a stream of liquid downwardly toward said tray and said outlet, the undersurface of said barrier communiating with said vapor inlet, said imperforate barrier being spaced above said deflection plate to define therebetween a vapor entry zone onto said tray, said zone being the sole path of communication between said vapor inlet and said tray to thereby cause all vapor entering through said vapor inlet to impinge in a single layer on said stream of liquid from beneath and in the direction of said outlet.

19. The improvement of claim 18 wherein said liquid inlet includes a first surface which is joined at one end to said tray and extends upwardly from said tray and inwardly toward said liquid outlet, said first surface is joined at its other end to a second surface, and said second surface extends downwardly toward said outlet and said tray, to an end over orificed portions of said tray, so as to define a vapor inlet between said surfaces and said tray.

20. The improvement of claim 19 wherein said apparatus includes a plurality of layers of unflattened expanded metal, said layers being parallel to and above said tray, positioned to be in contact with said liquid and said vapor flowing through said tray.

21. The improvements of claims 19 or 20 wherein said vapor inlet communicates with a slot formed by said second surface and a third surface joined to said tray, said third surface being parallel to and below said second surface.

22. The improvements of claims 19 or 20 wherein a downcomer carries liquid to said stage, said downcomer being defined in part by a vertical apron terminating above said tray to form the entrance to said inlet weir, and said first and second inlet weir surfaces extend at least as high as the lowest point of said apron.

23. The improvement of claim 19 or 20 wherein said deflection plate is joined to said third surface.

24. The improvement of claim 19 or 20 wherein said deflection plate is joined to said second surface.

25. The improvement of claim 20 wherein said deflection plate is above at least some of said layers.

26. The improvement of claim 20 wherein said deflection plate is positioned between said tray and the layer furthest from said tray.

27. The improvement of claim 19 or 20 wherein said deflection plate is in contact with said tray.

28. A method for retrofitting a vapor-liquid contacting apparatus of the crossflow type having a column housing and at least one contact stage in said housing, said apparatus including liquid and vapor inlets to said stage, an outlet weir from said stage, and an orificed tray mounted in said housing at said stage, said method comprising the steps of:

replacing said outlet weir with a higher outlet weir capable of retaining increased froth height on said tray, and providing means disposed above the tray to limit the increase in froth height to less than that increase which would otherwise accompany the increase in height of said outlet weir.

29. The method of claim 28 wherein said outlet weir is at least 4 inches high.

30. The method of claim 28 wherein said froth height limiting means comprises a multiplicity of spaced, generally vertical baffles above said tray, said baffles extending generally in the direction of liquid flow across said tray, and being sufficiently close together to substantially reduce the amplitude of vertical oscillations in said liquid, said oscillations having a wavelength which is small relative to the width of said tray, and said tray being orificed between each pair of said baffles.

31. The methods of claims 28, 29 or 30 wherein said froth height limiting means comprises a plurality of horizontal layers of unflattened expanded metal positioned above said tray to contact said liquid and said vapor flowing therethrough.

* * * * *